United States Patent Office 3,412,020
Patented Nov. 19, 1968

3,412,020
METHOD FOR FLOCCULATING SUSPENDED INORGANIC SOLIDS
Julian Louis Azorlosa, Dover, Del., assignor to GAF Corporation, a corporation of Delaware
No Drawing. Filed Aug. 8, 1966, Ser. No. 570,755
9 Claims. (Cl. 210—54)

The present invention relates to a new and improved process for flocculating suspended inorganic solids utilizing as the flocculant a hydrolyzed vinyl lactam/acrylamide copolymer.

In view of the increasing problems of stream and river pollution, the need for effective flocculants and the clarification of water for industrial use is extremely great and immediate.

Therefore, it is the principal object of this invention to provide a new and improved process for flocculating suspended inorganic solids utilizing hydrolyzed vinyl lactam/acrylamide copolymers. A particular object of this invention is to provide a new and improved process for flocculating aqueous paper mill sludge, employing said hydrolyzed copolymers. Other objects and advantages will become manifest from the following description.

In order to attain the foregoing objects, it is necessary to first prepare the hydrolyzed vinyl lactam/acrylamide copolymers. This is accomplished by copolymerizing in a polymerization apparatus from about 40 to 90% by weight of an N-vinyl lactam monomer with from about 10 to about 60% by weight of acrylamide or methacrylamide in aqueous solution with a free radical catalyst such aa azobisisobutyronitrile, lauroyl peroxide, benzoyl peroxide, t-butylperbenzoate hydrogen peroxide plus ammonia, etc., in the range of about 0.18% to about 0.25%, based on the weight of the total monomers and a pH of about 8, at a temperature of about 60 to 100° C., for a period of time ranging from 2 to 4 hours, followed by heating the reaction mixture in a steam bath for 1 to 3 hours. The resulting viscous colorless solution (unhydrolyzed based copolymer) has relative viscosity (1% weight by volume in water at 25° C.) of from about 6 to about 38, preferably about 12 to 38. The relative viscosity will depend on reaction temperature and monomer concentration.

The N-vinyl lactams which are copolymerized with either acrylamide or methacrylamide are characterized by the following formula:

$$\begin{array}{c} (CH_2)_n-CH_2 \\ | \quad\quad | \\ R-HC \quad C=O \\ \backslash \; / \\ N \\ | \\ CH=CH_2 \end{array}$$

wherein R is either hydrogen, methyl or an ethyl group and $n$ represents an integer of from 1 to 3.

As specific illustrations of such N-vinyl lactams, the following may be mentioned:

N-vinyl-2-pyrrolidone
N-vinyl-5-methyl-2-pyrrolidone
N-vinyl-5-ethyl-2-pyrrolidone
N-vinyl-2-piperidone
N-vinyl-6-methyl-2-piperidone
N-vinyl-6-ethyl-2-piperidone
N-vinyl-2-caprolactam
N-vinyl-7-methyl-2-caprolactam
N-vinyl-7-ethyl-2-caprolactam An aqueous solution of the prepared unhydrolyzed vinyl lactam/acrylamide or methacrylamide copolymers may then be hydrolyzed by adding about 1% to about 20%, preferably about 10% by weight of an alkaline solution such as $Na_2HPO_4$, NaOH, and the like, to said aqueous solution and then heating the mixture for approximately 3 hours at a temperature in the range of about 95 to 100° C. The amount of acrylamide or methacrylamide polymer units hydrolyzed in the final hydrolyzed copolymers used in the instant invention is within the range of about 3 to about 50% by weight.

I have discovered that the above mentioned hydrolyzed N-vinyl lactam/acrylamide or methacrylamide copolymers are extremely effective flocculating agents in the clarification of water for industrial use, e.g., silty river water, mine underground water, boiler water, drilling water, and in the settling of ore and coal fines and particularly paper mill sudge.

In brief, the process of flocculation consists of adding the cationic N-vinyl lactam-acrylamide copolymer to a given suspension with sufficient agitation to insure uniform distribution. When the system is quiescent, the flocculated aggregates will settle out. In general, there is an optimum range for the flocculant/suspended fines ratio. At too high a concentration, the flocculant would act as a suspending agent.

Thus, the instant invention is directed to a new and improved process of flocculating mineral solids from aqueous dispersions, the improvement which comprises adding to said dispersions from about 0.001 to 10 pounds per ton of mineral solids present in said dispersions a hydrolyzed vinyl lactam/acrylamide copolymer having the following formula:

$$\left[\begin{array}{c} (CH_2)_n-CH_2 \\ | \quad\quad\quad | \\ R-HC \quad\quad CO \\ \backslash \; / \\ N \\ | \\ -CH-CH_2- \end{array}\right]_A \left[\begin{array}{c} X \\ | \\ CO \\ | \\ -C-CH_2- \\ | \\ R_1 \end{array}\right]_B$$

wherein R and $n$ have the same values as stated above, $R_1$ represents a radical selected from the group consisting of hydrogen and methyl, and X represents both —OH and —NH$_2$ in the ratio from about 3 to 50% of —OH and 50 to 97% of —NH$_2$, A represents from about 40 to 90% by weight of the lactam moiety in said copolymer and B represents from about 10 to 60% of the acrylamide moiety in said copolymer.

The following examples are illustrative of the present invention and are not to be regarded as limitative. It is to be understood that all parts, percentages and proportions referred to herein and in the appended claims are by weight unless otherwise indicated.

Example I

A 60 weight percent of N-vinyl pyrrolidone and 40 weight percent of acrylamide copolymer was prepared by mixing 108 g. of distilled commercial N-vinyl-2-pyrrolidone and 0.36 g. of azobisisobutyronitrile together in a 5 liter flask equipped with a thermometer, stirrer, nitrogen inlet and water cooled condenser attached to a vacuum take off. To the solution was added 72 g. of acrylamide in 2820 g. of distilled water. The pH of the solution was adjusted to 8 by the addition of 6.3 ml. of 10% NaHPO$_4$. The system was then evacuated to 20 ml. and the vacuum released with nitrogen. The contents of the flask were then heated at 65–73° C. for 3 hours, then raised to 93° C. and held there for one hour. The resulting final product was a clear viscous liquid having a pH of 7.8 and a Brookfield viscosity of 12,000 cps., using a No. 7 RVT Spindle at 10 r.p.m. A 1% weight by volume aqueous solution had a relative viscosity of 18.82 at 25° C.

Example II 83.3 g. of a 6% solution of the 60 weight percent of N-vinyl-2-pyrrolidone and 40 weight percent of acrylamide copolymer prepared as in Example I, were added to 16.2 g. of water and 0.56 ml. of a 10% weight by volume solution of sodium hydroxide. These reactants were mixed together and heated for 3 hours at 95–100° C. Upon cooling to 25° C., the resulant viscous colorless copolymer had a Brookfield viscosity of 620 cps. using a No. 5 RVT Spindle and at 10 r.p.m. By analytical analysis 4.5% of the acrylamide polymer units in the above copolymer were found to be hydrolyzed.

Example III 83.3 g. of a 6% solution of the 60 weight percent of N-vinyl-2-pyrrolidone and 40 weight percent of acrylamide copolymer prepared as in Example I, were added to 15.3 g. of water and 1.4 ml. of a 10% weight by volume solution of sodium hydroxide. These reactants were mixed together and heated for 3 hours at 95–100° C. Upon cooling to 25° C., the resultant viscous colorless copolymer had a Brookfield viscosity of 8480 cps., using a No. 5 RVT Spindle and at 10 r.p.m. By analytical analysis 15.0% of the acrylamide polymer units in the above copolymer were found to be hydrolyzed.

Example IV 83.3 g. of a 6% solution of the 60 weight percent of N-vinyl-2-pyrrolidone and 40 weight percent of acrylamide copolymer prepared as in Example I, were added to 13.9 g. of water and 2.8 ml. of a 10% weight by volume solution of sodium hydroxide. These reactants were mixed together and heated for 3 hours at 95–100° C. Upon cooling to 25° C., the resultant viscous colorless copolymer had a Brookfield viscosity of 10760 cps., using a No. 5 RVT Spindle and at 10 r.p.m. By analytical analysis 24.9% of the acrylamide polymer units in the above copolymer were found to be hydrolyzed.

Example V 83.3 g. of a 6% solution of the 60 weight percent of N-vinyl-2-pyrrolidone and 40 weight percent of acrylamide copolymer prepared as in Example I, were added to 11.1 g. of water and 5.6 ml. of a 10% weight by volume solution of sodium hydroxide. These reactants were mixed together and heated for 3 hours at 95–100° C. Upon cooling to 25° C., the resultant viscous colorless copolymer had a Brookfield viscosity of 10800 cps., using a No. 5 RVT Spindle and at 10 r.p.m. By analytical analysis 32.8% of the acrylamide polymber units in the above copolymer were found to be hydrolyzed.

Example VI 83.3 g. of a 6% solution of the 60 weight percent of N-vinyl-2-pyrrolidone and 40 weight percent of acrylamide copolymer prepared as in Example I, were added to 5.5 g. of water and 11.2 ml. of a 10% weight by volume solution of sodium hydroxide. These reactants were mixed together and heated for 3 hours at 95–100° C. Upon cooling to 25° C., the resultant viscous colorless copolymer had a Brookfield viscosity of 8480 cps., using a No. 5 RVT Spindle and at 10 r.p.m. By analytical analysis 35.9% of the acrylamide polymer units in the above copolymer were found to be hydrolyzed.

The percentage of the acrylamide polymer units in the above prepared hydrolyzed copolymers was easily calculated by the analytical procedure of dissolving the same copolymer in water, making the solution acidic by adding HCL and titrating with a standard 0.5 g. sodium hydroxide base to obtain two potentiometrically breaks. From this, one may easily calculate the percentage of sodium acrylate present as well as the percentage of acrylamide units hydrolyzed.

Example VII

To determine the effectiveness of the hydrolyzed copolymers of Examples II to VI, the Freeness test was used. Freeness is a paper industry term denoting the rate at which water drains away from pulp in the formation of paper sheet. The procedure was as follows:

Eleven separate samples of an aqueous paper mill sludge composition having a pH of 6.1 and a consistency of 0.6% were diluted to a 0.2% consistency at 15° C. in a cylinder. One of these samples was employed as a control. To the remaining 10, 0.05% by weight aqueous solution of hydrolyzed copolymers of Examples II to VI were added. The amount of agent sludge coagulant (hydrolyzed copolymer) added corresponded to 24 and 48 pounds of 100% copolymer per ton of sludge solids. All of the cylinders were then inverted five times and immediately poured into a Schopper Riegler Freeness Tester, which was used to calculate the total volume of water drained in each case in one minute. The results recorded were as follows:

TABLE I

| Hydrolyzed Copolymer | Lbs. 100% Copolymer per Ton Sludge Solids | Total Flow in Mls. |
| --- | --- | --- |
| Control (no copolymer) | 0 | 285 |
| Example II | 2.4 | 340 |
| Example III | 2.4 | 380 |
| Example IV | 2.4 | 380 |
| Example V | 2.4 | 390 |
| Example VI | 2.4 | 380 |

TABLE II

| Hydrolyzed Copolymer | Lbs. 100% Copolymer per Ton Sludge Solids | Total Flow in Mils. |
| --- | --- | --- |
| Control (no copolymer) | 0 | 285 |
| Example II | 4.8 | 360 |
| Example III | 4.8 | 410 |
| Example IV | 4.8 | 420 |
| Example V | 4.8 | 430 |
| Example VI | 4.8 | 430 |

Similar results may be obtained by replacing the vinyl pyrrolidone in the above copolymers with such n-vinyl lactams as N-vinyl-5-methyl-2-pyrrolidone, N-vinyl-5-ethyl-2-pyrrolidone, N-vinyl2-piperidone, N-vinyl-6-methyl-2-piperidone, N-vinyl-6-ethyl-2-piperidone, N-vinyl-2-caprolactam, N-vinyl-7-methyl-2-caprolactam and N-vinyl-7-ethyl-2-caprolactam as well as replacing the acrylamide unit with methacrylamide.

Various modifications and variations of this invention will be obvious to a worker skilled in the art and it is understood that such modifications and variations are to be included within the purview of this application and the spirit and scope of the appended claims.

I claim:

1. In a process for flocculating mineral solids from aqueous dispersions, the improvement which comprises using as the flocculant agent in amounts of about ¼ to 20 pounds per ton of mineral solids present in said dispersions, a hydrolyzed vinyl lactam/acrylamide copolymer having the following general formula:

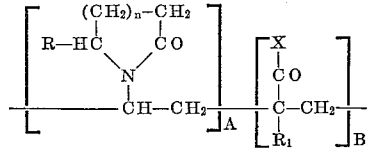

wherein R representing a radical selected from the group consisting of hydrogen, methyl and ethyl radicals, wherein $n$ represents an integer of from 1 to 3 inclusive, wherein $R_1$ represents a radical selected from the group consisting of hydrogen and methyl, wherein X represents both —OH and —NH₂ in the ratio from about 3 to 50% of —OH and about 50–97% of —NH₂, wherein A represents from about 40–90% by weight of the lactum moiety in said copolymer and wherein B represents from about 10–60% by weight of the acrylamide moiety in said copolymer.

2. An improved process according to claim 1, whereby R and $R_1$ both represent a hydrogen radical, wherein $n$ represents the integer 1 and wherein A represents 60% by weight of the lactam moiety in said copolymer and wherein B represents 40% by weight of the acrylamide moiety in said copolymer.

3. In a process for flocculating mineral solids from aqueous dispersions of a paper mill sludge, the improvement which comprises using as the flocculant agent in amounts of about ¼ to 20 pounds per ton of mineral solids present in said dispersions, a hydrolyzed vinyl lactam/acrylamide copolymer having the following general formula:

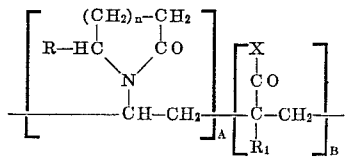

wherein R representing a radical selected from the group consisting of hydrogen, methyl and ethyl radicals, wherein $n$ represents an integer of from 1 to 3 inclusive, wherein $R_1$ represents a radical selected from the group consisting of hydrogen and methyl, wherein X represents both —OH and —$NH_2$ in the ratio from about 3 to 50% of —OH and about 50–97% of —$NH_2$, wherein A represents from about 40–90% by weight of the lactam moiety in said copolymer and wherein B represents from about 10–60% by weight of the acrylamide moiety in said copolymer.

4. An improved process according to claim 3, wherein R and $R_1$ both represent a hydrogen radical, wherein $n$ represents the integer 1 and wherein A represents 60% by weight of the lactam moiety in said copolymer and wherein B represents 40% by weight of the acrylamide moiety in said copolymer.

5. An improved process according to claim 4, wherein X represents both —OH and —$NH_2$ in the ratio of 4.5% of —OH and 95.5% of —$NH_2$.

6. An improved process according to claim 4, wherein X represents both —OH and —$NH_2$ in the ratio of 15.0% of —OH and 85% of —$NH_2$.

7. An improved process according to claim 4, wherein X represents both —OH and —$NH_2$ in the ratio of 24.9% of —OH and 75.1% of —$NH_2$.

8. An improved process according to claim 4, wherein X represents both —OH and —$NH_2$ in the ratio of 32.8% of —OH and 67.2% of —$NH_2$.

9. An improved process according to claim 4, wherein X represents both —OH and —$NH_2$ in the ratio of 35.9% of —OH and 64.1% of —$NH_2$.

References Cited

UNITED STATES PATENTS

| | | | |
|---|---|---|---|
| 3,146,193 | 8/1964 | Sullivan | 210—54 |
| 3,235,490 | 2/1966 | Goren | 210—52 |

MICHAEL E. ROGERS, *Primary Examiner.*

UNITED STATES PATENT OFFICE
CERTIFICATE OF CORRECTION

Patent No. 3,412,020                                November 19, 1968

Julian Louis Azorlosa

It is certified that error appears in the above identified patent and that said Letters Patent are hereby corrected as shown below:

Column 1, line 31, "aa" should read -- as --. Column 2, line 12, "sudge" should read -- sludge --. Column 3, line 4, "620" should read -- 6200 --; line 44, "polymber" should read -- polymer --. Column 4, line 34, "vinyl 2" should read -- vinyl-2 --; line 68, "whereby" should read -- wherein --.

Signed and sealed this 17th day of March 1970.

(SEAL)
Attest:

Edward M. Fletcher, Jr.                          WILLIAM E. SCHUYLER, JR.
Attesting Officer                                         Commissioner of Patents